United States Patent [19]

Faber et al.

[11] Patent Number: 4,917,855

[45] Date of Patent: Apr. 17, 1990

[54] APPARATUS FOR THE SHUTDOWN OF A HIGH TEMPERATURE NUCLEAR REACTOR

[75] Inventors: Ralf Faber, Juelich; Hubert Handel, Rimbach; Reinhard Mauersberger, Juelich; Josef Schoening, Hambruecken; Hermann Schmitt, Winnweiler, all of Fed. Rep. of Germany

[73] Assignee: Hochtemperatur-Reaktorbau GmbH, Dortmund, Fed. Rep. of Germany

[21] Appl. No.: 155,130

[22] Filed: Feb. 11, 1988

[30] Foreign Application Priority Data

Feb. 14, 1987 [DE] Fed. Rep. of Germany ....... 3704746

[51] Int. Cl.⁴ .............................................. G21C 7/12
[52] U.S. Cl. .................................... 376/338; 376/265
[58] Field of Search .............. 376/381, 382, 337, 338, 376/265, 266

[56] References Cited

U.S. PATENT DOCUMENTS

| | | | |
|---|---|---|---|
| 3,088,903 | 5/1963 | Firth | 376/338 |
| 3,136,701 | 6/1964 | Sidebottom et al. | 376/338 |
| 4,120,753 | 10/1978 | Malaval | 376/338 |
| 4,545,954 | 10/1985 | Ullrich et al. | 376/338 |
| 4,664,871 | 5/1987 | Schoening | 376/338 |
| 4,789,519 | 12/1988 | Schoening et al. | 376/381 |
| 4,798,700 | 1/1989 | Elter et al. | 376/338 |

FOREIGN PATENT DOCUMENTS

| | | | |
|---|---|---|---|
| 1265596 | 11/1986 | Japan | 376/338 |
| 1122272 | 8/1968 | United Kingdom | 376/265 |
| 1208877 | 10/1970 | United Kingdom | 376/265 |
| 1313188 | 4/1973 | United Kingdom | 376/338 |

Primary Examiner—Harvey E. Behrend
Attorney, Agent, or Firm—Robert J. Koch

[57] ABSTRACT

A shutdown system for a high temperature nuclear reactor where absorber material elements in the form of balls pass from an elevated reservoir into a vertical channel formed by aligned vertical cavities in horizontal, nose-shaped projections from the side reflector. The balls are transported back to the reservoir by way of a conveyor device. It must be insured that even in the case of accidents the absorber balls arrive in the cavities and that a rapid return of the absorber balls into the reservoir takes place. For the purpose, the reservoir is provided with an automatically-actuated and controllable device for releasing an opening between the reservoir and the vertical channel feed line. Below the channel is a removal tube terminating in a housing and arranged to form a pile of the absorber balls which seals the removal tube. To return the absorber balls, a metering gas acts on the pile and brings the absorber balls to a carrier gas. The carrier gas returns the absorber balls into the reservoir while the gaseous proporation of the carrier gas flow is returned for the reservoir into the pressure vessel.

20 Claims, 6 Drawing Sheets

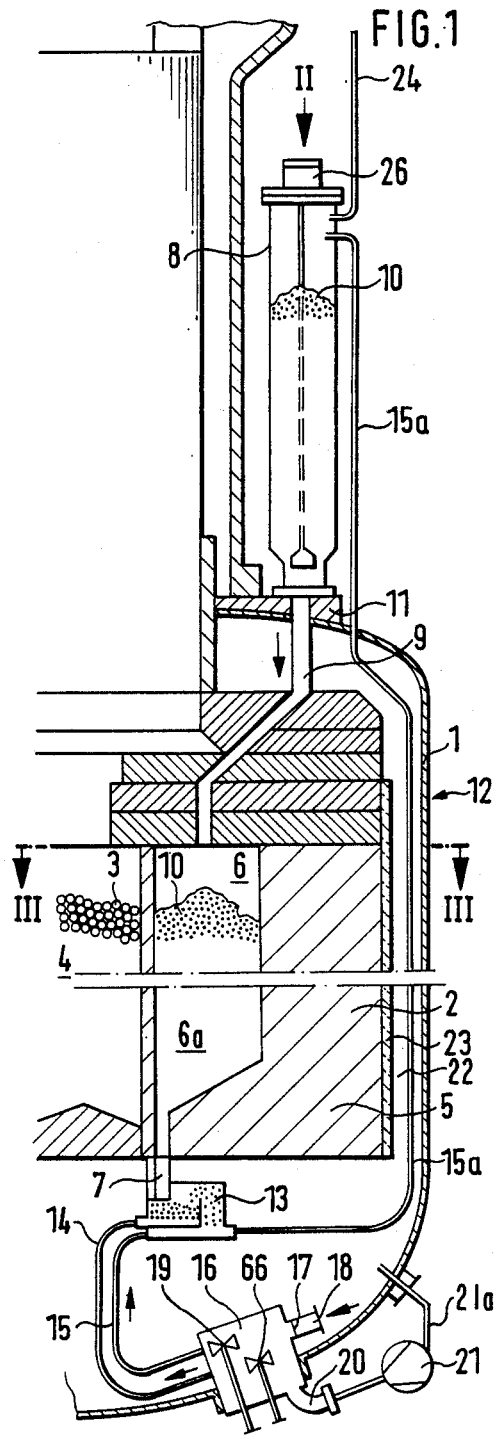
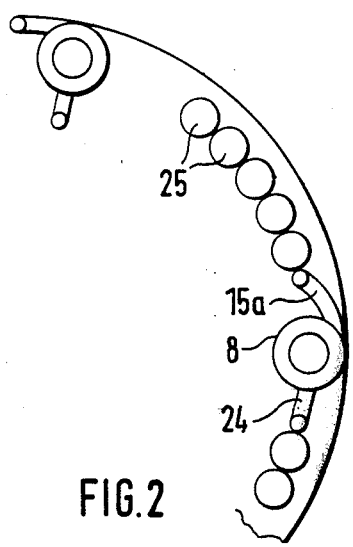
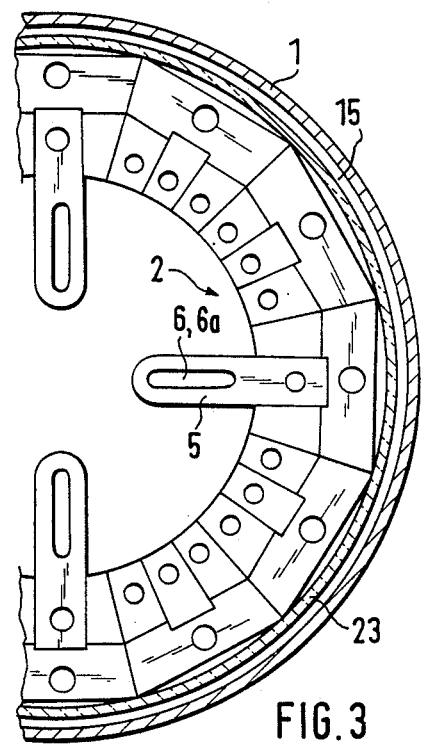
FIG.1
FIG.2
FIG.3

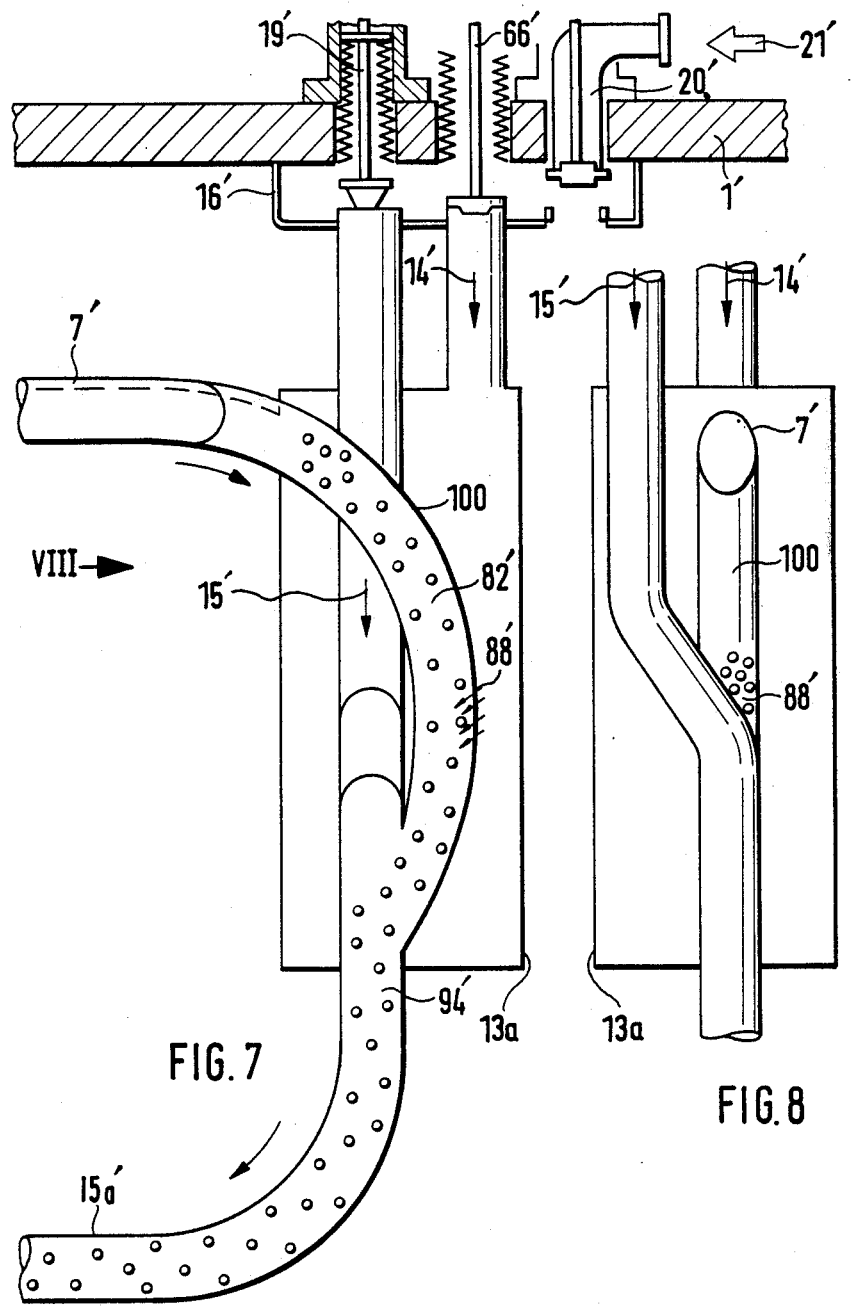

APPARATUS FOR THE SHUTDOWN OF A HIGH TEMPERATURE NUCLEAR REACTOR

The invention concerns an apparatus for the shutdown of a high temperature nuclear reactor. In particular, the invention is useful in reactors having a circular cylindrical core filled with a bed of spherical fuel elements with a side reflector and pressure vessel surrounding the core. A plurality of nose-shaped projections protrude from the side reflector and extend into the core. A vertical channel is formed within aligned projections which may be filled by spherical absorber elements. A feed line and removal tube are provided to the vertical channels for absorber element transport. A recycle system is formed between the removal tube and the feed line for passing the absorber balls into a reservoir above the pressure vessel and in communication with the feed line for reuse.

BACKGROUND OF THE INVENTION

A similar apparatus to that described above is disclosed in co-pending application Ser. No. 005,584 whose disclosure is herein incorporated by reference. The systems for the supply, removal, and conveyance for the absorber balls in that application work too sluggishly to be used as a shutdown apparatus in addition to the reflector rods.

SUMMARY OF THE INVENTION

It is an objective of the invention to provide an apparatus capable of assuring rapid movement of the absorber balls and testing of the apparatus during the operation of the nuclear reactor.

This objective is attained by associating the reservoir with a redundant apparatus for releasing an opening between the reservoir and the feed line. The feed line communicates with a vertical channel formed by vertically adjacent horizontal projections having vertical passages The removal tube terminates in a housing which forms a pile of absorber balls thereby sealing the housing from the vertical channel. The resulting vertical channel is of sufficient volume to hold enough absorber balls to shut down the reactor. At the bottom of the vertical channel is a removal tube for discharging the absorber balls. Preferably, four vertical channels are formed around the internal circumference of the reactor.

The metering flow of gas assures the removal and return of a predetermined, targeted volume of balls. The metering gas transfers the absorber balls to a carrier gas which transports the balls to an elevated reservoir. The absorber balls and the carrier gas separate in the reservoir. This separation assures that pressure does not build up in the reservoir and that the absorber balls enter the nose-shaped projection channels by gravity alone. An absorber ball feed apparatus controls the timing and rate of ball movement.

During operation of the nuclear reactor, the absorber ball transport apparatus may be tested by running a few absorber balls through the system without adversely affecting reactor operation. Preferably, the redundant apparatus and the metering and carrier flow controls are located or accessible from outside the pressure vessel. Periodic or continuous testing of these components is therefore possible while the reactor is in operation.

The redundant ball feed apparatus is preferably activated by natural forces (in the event of power failure) or by deliberate control (incident avoidance). In the disclosed apparatus, the safety system may operate due to gravity or hydraulic pressure.

According to a preferred embodiment, the absorber ball feed apparatus comprises a housing mounted on the top cover of the reservoir. At least two pistons are associated with the housing and are connected to a piston rods which extend through the cover of the reservoir. Each rod carries parts of a ball feed closure apparatus which are displaceable relative to each other and control an opening between the reservoir and the feed line.

In order to obtain a compact configuration, the pistons are guided in parallel, adjacent cylindrical bores.

Another ball feed embodiment provides pistons located above and coaxial to each other. A first piston rod attached to the upper piston passes coaxially through a sleeve-like second piston rod attached to the lower piston. The second piston has a shoulder acting against the bottom of the reservoir cover and serving as the counter support for a part of the ball feed apparatus. The second piston is constantly exposed to vertical hydraulic pressure thereby continuously supporting this part of the feed apparatus. In normal operation, the first piston is displaced to open and close the feed apparatus. In the event of accident, the vertical hydraulic pressure is removed and the second piston moves down opening a line for shutdown.

This coaxial configuration makes it possible to control the ball feed apparatus even under restricted space conditions.

Position indicators are located in the jacket of the housing for determining the position of the pistons. This renders the structural parts readily accessible for position determination during testing and maintenance.

A preferred embodiment of the ball feed apparatus uses a safety device having a center disk and a concentric ring. The upper surface of the ring slopes toward the center of the reservoir. The disk surface slopes outward toward the ring and is designed to leave a gap of less than half the diameter of an absorber ball (less than a ball radius) between the disk and the ring. Normally, the disk is raised to increase the gap opening and allow absorber balls to fall into a feed line communicating with the vertical channel in the horizontal projections in the reactor. The ring is continuously supported in its raised position. The ring will move downward and assure absorber ball feeding in the event of an accident. Absorber material moving into the vertical channels will shutdown the reactor.

In order to accelerate the absorber ball discharge from the channels, the cavities in the bottom horizontal nose-shaped projections are shaped to form an oblique angle toward the removal tube thereby acting as a funnel toward the opening.

The removal tube terminates in a means for transporting the balls back to the elevated reservoir for reuse. By appropriate design, the bottom of the removal tube will have a controlled removal of balls. In this way, a standing column of balls may be formed in the tube to seal the tube from the transport means.

The standing column of absorber balls will be supported by a partially perforated plate in the transport housing. Metering gas from a chamber under the plate will remove balls from the periphery of the column and transport a controlled number of balls into a carrier stream. The plate perforations are located outside the area directly beneath the removal tube so that the seal of the removal tube is not adversely affected by metering gas.

The path between the removal tube outlet and the carrier gas inlet should contain at least one angle less than 90° from the removal tube vertical axis. This path angle will form a restriction point for the absorber balls and permit controlled sealing of the tube.

A lower angled wall adjacent the support plate aids in forming the restriction point in one embodiment. Absorber balls from the removal tube move laterally across the perforated support plate and stop at the lower angled wall. Absorber balls form a column in the tube and a peripheral pile outside the tube. Metering gas transports the balls away from the peripheral ball pile.

Below the lower angled wall is carrier gas line for transporting the balls to an elevated reservoir. Balls passing over the lower angled wall fall thru an opening in the gas line. Preferably, the carrier gas line is narrowed upstream of the opening to form a venturi-effect suction across the opening. The resulting suction aids in the movement towards the carrier gas line and reduces the loss of carrier gas line pressure.

Another embodiment of the return transport means is a removal tube configuration in the form of a bend larger than 90° total in the transport housing. The downstream end of the bend (with respect to the ball flow) opens into a carrier gas line. The bend angle should be measured between the removal tube axis and a tangent from the tube centerline where it connects with the carrier gas line. In the bend, absorber balls accumulate and form the tube seal and peripheral piles. At least part of the bend facing the carrier gas line has perforations for metering gas to contact the peripheral pile of absrober balls.

A closed housing around both the tube bend and its joint with the carrier gas line permits a controlled transport of absorber balls.

To prevent the introduction of a foreign gas, carrier and metering gas may be the cold gas of the reactor plant. The cold gas is made to flow into a distributor housing from which the lines for the carrier and metering gas lead. Within the distributor housing are fittings for each of those lines.

The distributor housing is preferably a part of the wall of the pressure vessel. On the side wall of the distributor housing is a connection for an auxiliary blower. The housing also has fittings for withdrawing cold gas from inside the vessel and reintroducing that gas into the distributor housing. Trim and metering valves are provided for distributing and directing the gas flow.

When the carrier gas line and the entrained balls reach the elevated reservoir, the carrier gas line opens tangentially into the reservoir. This tangential introduction results in a braking and cyclone separator action for the balls, so that they arrive in the reservoir gently.

The line leading away from the reservoir (for returning the carrier gas into the pressure vessel) leaves the reservoir radially.

To obtain a return flow of the carrier gas with low losses, the line leading away from the reservoir is conducted to a blower inlet or a steam generator outlet within the reactor system.

To prevent or equalize uneven absorber ball loads in the vertical channels during reactivation of the reactor plant, the reservoirs have fill height measuring instruments. The fill height differences derived in this manner may be equalized by control over the individual carrier gas flows and removal rates.

Each reservoir contains approx. 775 000 balls. This number may vary depend on the particular ball diameter used.

The advantage of the invention is found in the simplicity of the introduction method and apparatus. Introducing the required number of balls and their metered return may be carried out in a simple and progressive manner while making periodic testing possible without affecting the reactor substantially. The apparatus may be used regardless of the absorber ball size.

The invention is further described below by reference to the drawings. Further embodiments and advantages are also described.

BRIEF DESCRIPTION OF THE DRAWINGS

In the drawings:

FIG. 1 shows a longitudinal section through a partial area of a reactor vessel with the shutdown system, FIG. 2 is a view in the direction of the arrow II of FIG. 1 with a different layout of the inlet and outlet of the carrier gas in a reservoir, FIG. 3 illustrates a section along the line III—III in FIG. 1.

FIG. 7 illustrates a different configuration of the partial area of FIG. 6 and FIG. 8 depicts a view in the direction of the arrow VII of FIG. 7.

DETAILED DESCRIPTION OF THE DRAWINGS

Figure 4:
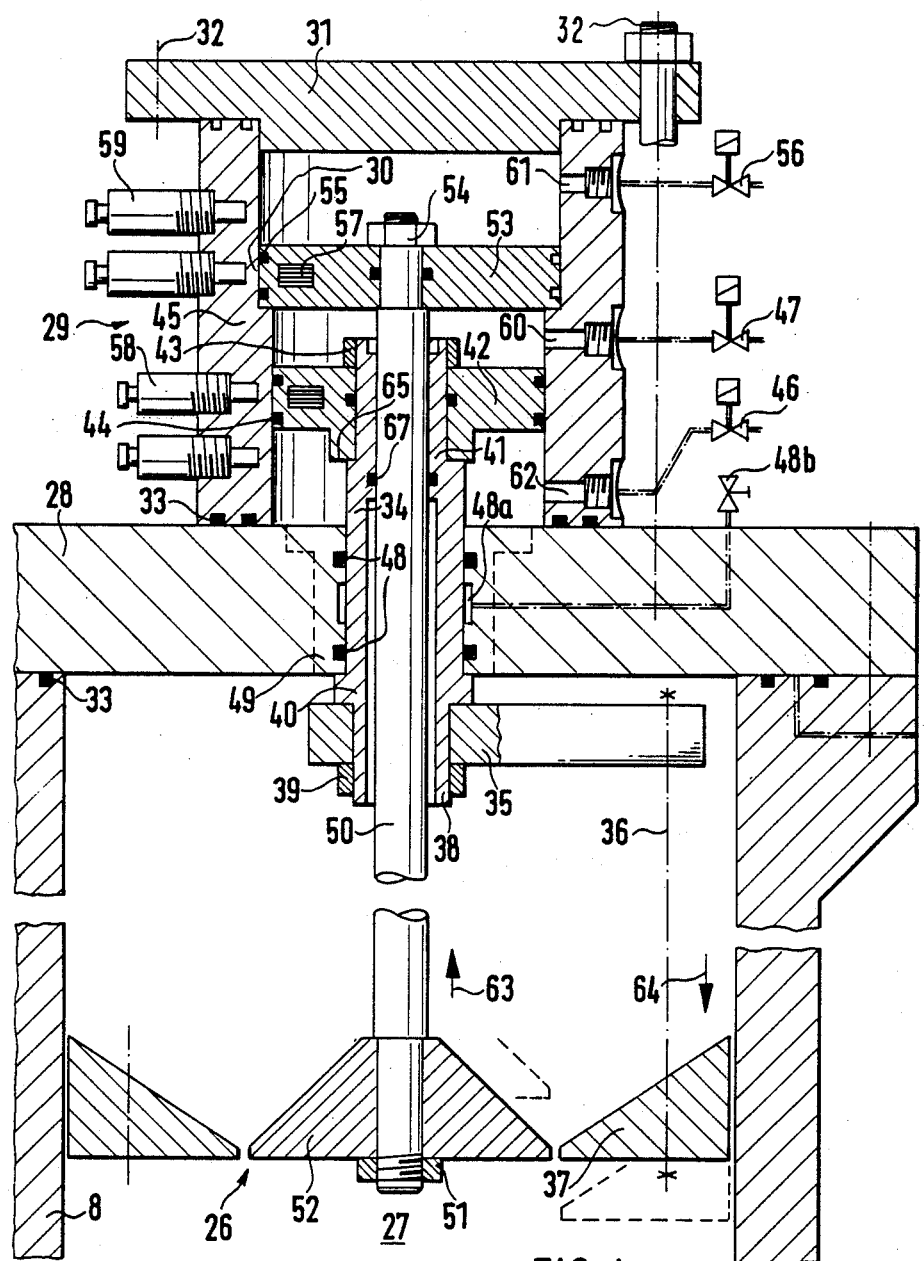
FIG. 4 represents at a larger scale a section through a reservoir for the absorber balls and device for the actuation of a closure of the opening.

FIG. 1 shows pressure vessel 1 containing a side reflector 2 and a bed of spherical fuel elements 3 in core 4. Side reflector 2 is constructed of individual elements (not shown in detail) and has four nose-shaped horizontal projections 5 radially protruding into and evenly distributed around core 4. (Three projections are shown in FIG. 3.)

Each horizontal projection 5 has a vertical cavity 6 in the shape of an elongated hole which is aligned with cavities in projections above and below to form a vertical channel 6A sized to pass absorber balls therethrough. Advantageously, vertical channel 6A formed by cavities 6 will guide absorber balls through core 4 to removal tube 7. The channel formed by cavities 6 is depicted as tapering at an oblique angle (with reference to a vertical axis) away from side reflector 2 and toward a center portion of core 4. This taper forms a decreased cross sectional area for absorber balls moving into removal tube 7 and reservoir of absorber balls 10 with a controllable residence time in vertical channel 6A.

To shut down the nuclear reactor, absorber balls 10 are introduced into uppermost cavity from elevated reservoir 8 through a feed line 9. Absorber balls 10 will flow through cavity 6 and accumulate in vertical channel 6A. Cavities 6 are preferably oval in horizontal cross section and sized so that channel 6A will hold a sufficient number of absorber balls 10 to shutdown the reactor.

Each vertical channel 6A (as formed by distributed projections 5) is associated with a reservoir 8 mounted on a flange 11 of the reactor pressure vessel 1. Feed line 9 extends through roof reflector 12 and forms a communicating passageway between reservoir 8 and cavity 6. Feed line 9 passes obliquely through the roof reflector so as not to impair the effectiveness of the roof reflector.

During the startup process, absorber balls 10 from flow control housing 13 are moved by metering gas 14 into carrier gas 15 passing through flow control housing 13. Both metering gas 14 and carrier gas 15 are supplied from a common distributor housing 16 drawing cold gas of the reactor through fitting 18 and check valve 17. [Cold gas is defined herein as the gas circulating in the pressure vessel prior to entering the core.] A portion of this incoming cold gas is divided into metering gas 14 with the remaining portion forming carrier gas 15.

Inside distributor housing 16, is a trim valve 19 for carrier gas 15 a metering valve 66 for metering gas 14. These valves are used to control the relative proportions of gas flowing as carrier gas and metering gas. As a backup, auxiliary blower 21 may be mounted externally to housing 16 by fitting 20 for providing a pressurized gas supply to housing 16. Backup line 21a may be used to supply reactor cold gas. Carrier gas 15a leaving housing 13 conveys absorber balls 10 upwardly to elevated reservoir 8. Carrier gas 15a passes through annular space 22 between the inner wall of the pressure vessel 1 and a thermal shield 23 and the pressure vessel in the vicinity of the flange 11 before entering the elevated reservoir 8 at its upper end. The absorber balls fall down into the reservoir while the gaseous component of carrier gas 15a leaves reservoir 8 through exhaust line 24 and flows back into the pressure vessel 1 at some point (not shown). Preferably, the gas in line 24 is conducted to an outlet of a steam generator and an inlet of a blower where it joins the gas circulating in the pressure vessel.

As seen in FIG. 2 (which shows a top view of the reservoir), carrier gas flow 15a is introduced tangentially into reservoir 8 in order to generate a cyclone separator action. In contrast, exhaust line 24 passes exiting gas radially outward from the center of reservoir 8. FIG. 2 further shows two of a desirable four reservoirs 8 (only two are shown) are located in a space saving manner on the circle segment of the reflector rod drives 25.

FIG. 4 shows (in more detail) an upper area of the reservoir 8 and absorber element control device 26. Control device 26 releases or closes opening 27 between reservoir 8 and feed line 9. Stepped housing 29 is mounted on cover 28 of reservoir 8 by closure cap 31 engaging upper step 30 of housing 29 and screws 32 engaging cover 28.

O-rings 33 are used to seal at least the following joints; between cover 28 and a top surface of reservoir 8; between a top surface of cover 28 and a bottom surface of stepped housing 29; and between a top surface of housing 29 and a bottom surface of closure cap 31. Additional seals are depicted and others may be used if desired.

Sleeve 34 passes through cover 28 and extends downwardly into reservoir 8 and upwardly into housing 29. At the lower end protruding into reservoir 8 is a support star 35. A plurality of threaded rods 36 (depicted as a dashed line) extend down from support star 35 and suspend funnelling ring 37. Ring 37 has a triangular or trapezoidal cross section with a taper towards the center of reservoir 8. Ring 37 is sized to fit within reservoir 8 while leaving a clearance for expansion and insertion movements.

Support star 35 fits around bottom end 38 of sleeve 34 and is secured in position by threaded ring 39 restrain star 35 against support surface 40. Support surface 40 abuts against the cover 28 with a shoulder opposite the support ring.

At the end of sleeve 34 projecting upwardly into housing 29, sleeve 34 has a shoulder 41 to support first piston head 42. Threaded ring 43 lies around sleeve 34 and above first piston head 42 securing first piston head 42 against shoulder 41. Piston head 42 is equipped with first piston sealing rings 44 acting against the inner wall of the step 45 of the housing 20. This arrangement forms a hydraulic piston so that pressure medium (hydraulic oil) controlled by valves 46 and 47 is able to displace first piston head 42 and sleeve 34 relative to housing 29.

In cover 28 and around sleeve 34 is a sealing cartridge 49 having gaskets 48 near the top and bottom of cover 28. Between gaskets 48 is annular space 48a which would collect leaking pressure medium. Fitting 48b monitors annular space 48a for leakage.

Piston rod 50 extends from housing 29 to the bottom of reservoir 8 by passing through sleeve 34. Gasket 67 seals the circumfrence of piston rod 50 against the inside of sleeve 34 to form a piston-cylinder joint. At the upper end of piston rod 50 is a second piston head 53 which is clamped against a shoulder of piston rod 50 by nut 54. Second piston sealing ring 55 assures a piston-cylinder connection with step 30 of housing 29 so that piston 53 may be moved with piston rod 50 relative to the housing 29 by pressure medium (hydraulic oil) controlled by valves 47 and 56.

First piston head 42 and second piston head 53 are associated with a sensor 57 so that the position of each piston may be ascertained with respect to position indicators 58 and 59.

At the end of rod 50 protruding into reservoir 8 is tapered a disk 52. Disk 52 is mounted to rod 50 by threaded ring 51. Disk 52 is tapered toward the outside of reservoir 8 in opposition to the taper direction of ring 37. Disk 52 extends from the center of reservoir 8 toward the inner circumference of funnelling ring 37 yet is of a smaller radius than the maximum possible. A gap should be formed between disk 52 and ring 37. Preferably, that gap is about or less than half the diameter of an absorber ball.

It should be noted that FIG. 4 depicts spaces for additional sealing means (such as O-rings) between; cap 31 and housing 29; cover 28 and housing 29; first and second piston heads 42 and 53 and housing 29; and reservoir 8 and cover 28. In operation, these spaces will contain sealing gasket material. Other sealing means and locations may be used if desired.

In the minimum-gap, closed position shown in FIG. 4, disk 52 and the ring 37 are located in one plane so that feed line 9 is closed. A pile of absorber balls of approx. 0.5 m$^3$ is located in reservoir 8 above disk 52 and ring 37. Second piston head 53 is supported on a shoulder between the different diameters of steps 30 and 45 of housing 20. Valves 47 and 56 belonging to middle and upper inlet openings 60 and 61 are closed. Valve 46 associated with bottom inlet opening 62 is open so that first piston head 42 is exposed to an upward pressure. Support surface 40 represents a stop for the upward motion of the piston 42.

If the nuclear reactor is to be shutdown, absorber balls must pass from reservoir 8 into the corresponding vertical channel 6a of nose like projections 5 (FIG. 1). For filling the channel, valves 47 and 56 are opened. Pressure to second piston head 53 is applied by pressure medium through valve 47 and opening 60. Second piston head 53, piston rod 50, and disk 52 are moved upwardly in the direction of the arrow 63 into the first filling position indicated by the broken line in FIG. 4. The pressure applied through bottom inlet opening 62 is at least as high as the pressure applied through the middle inlet opening 60 so that first piston head 42 remains in position with support surface 40 of sleeve 34 abutting against the bottom side of cover 28.

A second filling position is achieved by moving funnelling ring 37 instead of piston rod 50 and disk 52. If for any reason the supply of the pressure medium fails, the second filling position is passively actuated. If there is no pressure from bottom inlet opening 62, the weight of the absorber balls resting on funnelling ring 37 moves ring 37 downwardly (arrow 64) into the position indicated by the second set of the broken lines shown in FIG. 4. First piston head 42 will follow this movement through threaded rods 36, support ring 35 and sleeve 34 until it comes to rest with its shoulder 65 on the top side of cover 28.

Ring 37 represents a safety means for assuring that absorber material elements (balls 10) enter the shutdown apparatus. Disk 52 is a deliberate means for unblocking opening 27. These redundant opening position ensures reliable operation of the shutdown sequence even in the event of apparatus failure.

Figure 5:
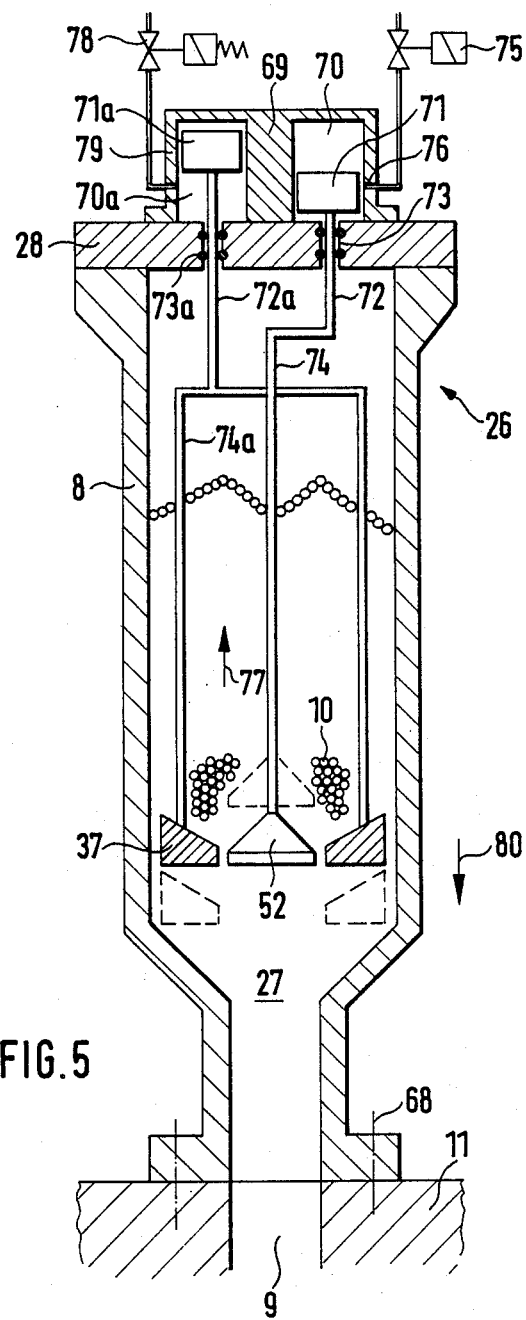
FIG. 5 shows a different device for the actuation of a closure of the opening.

A further embodiment for releasing absorber materials into feed line 9 is shown in FIG. 5. Reservoir 8 is mounted on flange 11 of pressure vessel 1 by schematically-depicted bolts 68. Funnelling ring 37 and disk 52 are the same as that described with respect to FIG. 4.

The difference relative to the embodiment of FIG. 4 lies in the control means for the movement of funnelling ring 37 and disk 52.

Instead of the piston rod-and-sleeve arrangement shown in FIG. 4, the control apparatus may use separately controllable chambers. FIG. 5 schematically illustrates the use of two parallel chamber 70 and 70a within housing 69. Housing 69 is attached to the top of cover 28 with openings in cover 28 for disk piston rod 72 and ring piston rod 72a. Disk rod is attached to disk 52 by disk extension rod 72. Ring rod 72a is connected to ring 37 by ring extension arms 74a. Appropriate sealing means 73 and 73a are located within the cover openings and are designed to prevent pressure medium from leaking into reservoir 8. A leak detection means such as that shown in FIG. 4 may be used in the embodiment of FIG. 5 although not depicted for easier illustration.

Figure 5A:
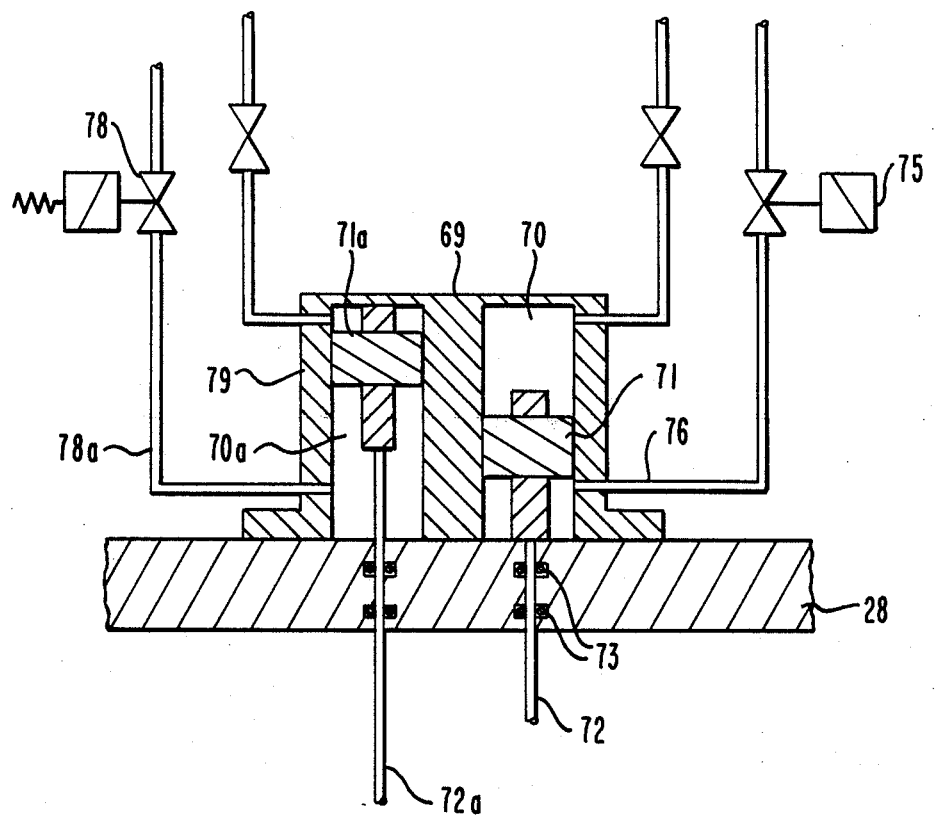
FIG. 5a shows details of the embodiments of FIG. 5.

FIG. 5a will be used to augment the description of the operation of this alternate embodiment schematically illustrated in FIG. 5.

When disk piston head 71 is down and ring piston head 71a is up, disk 52 and ring 37 are in their minimum gap position and absorber balls 10 remain in reservoir 8. As in the embodiment of FIG. 4, this "minimum gap" distance should be no larger than about half the diameter of the absorber balls to prevent unintended absorber material passage into the reactor.

Constant pressure is applied to chamber 70a and ring piston head 71a through pressure medium from valve 78 and line 78a. Through ring extension arms 74a, ring 37 is maintained in its elevated position. FIG. 5a clarifies the schematic illustration in FIG. 5 more clearly showing the placement of pressure medium inlets, upper and lower piston head spacers, and an hydraulic seal between piston heads 71 and 71a and housing 69.

Similar to FIG. 4, disk 52 is moved upward (arrow 77 in FIG. 5) by applying pressure to the bottom face of disk piston head 71. When displaced sufficiently, the gap between disk 52 and ring 37 will exceed the absorber ball diameter and absorber balls 10 will begin to enter vertical channel 6a in horizontal projections 5. Pressure medium, e.g. hydraulic oil, will flow into the bottom of chamber 70 though valve 75 and line 76.

In case disk piston head 71 cannot be made to rise or the system fails, piston head 71 will move to its bottom position. Ring piston head 71a will then be allowed to or will naturally move to its bottom position (arrow 80) due to the weight of absorber balls 10 and a reduction in the pressure from valve 78 and line 78a. The gap between disk 52 and ring 37 will enlarge until absorber balls 10 are able to pass between them.

Figure 6:
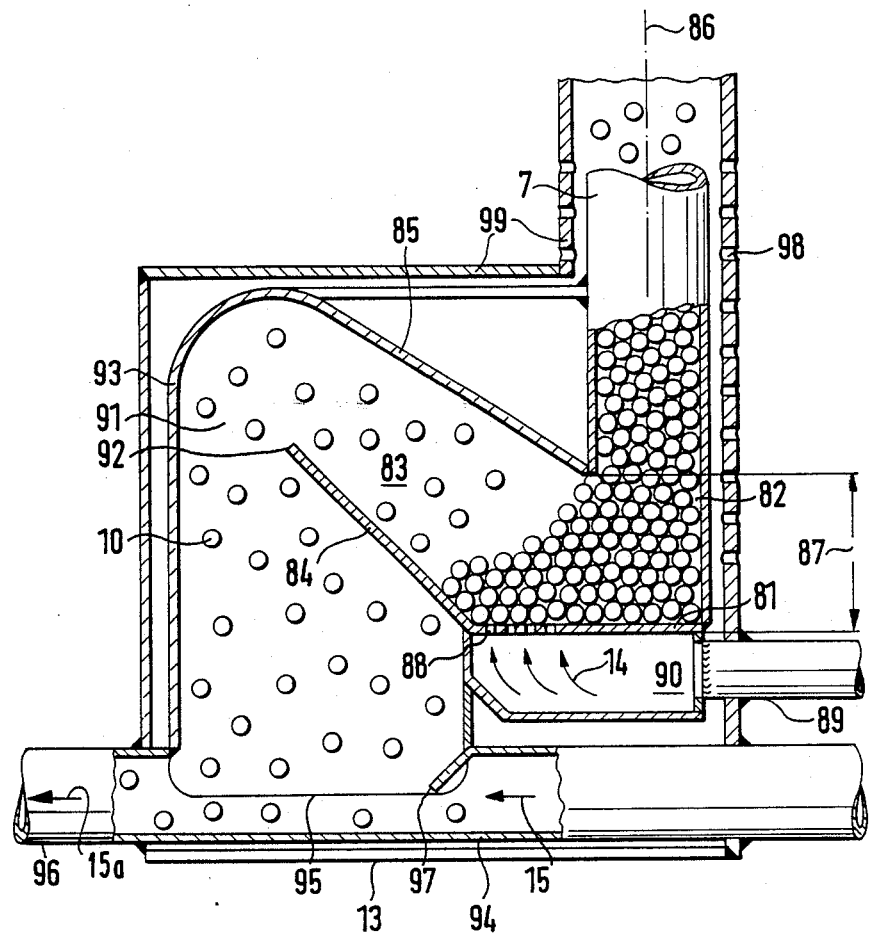
FIG. 6 is at a larger scale the partial area for the removal and conveyance of the absorber balls.

FIG. 6 illustrates the gas entrainment apparatus within housing 13 in more detail. The entrainment device is designed to provide a controllable flow of particulate elements (such as absorber balls 10) to carrier gas 15 for entrainment and delivery to elevated reservoir 8. The apparatus uses a controlled flow of metering gas 14 through partially perforated support plate 81 to carry absorber balls 10 away from the periphery of sealing/metering chamber 82, into metering shaft 83, over angled lower guide wall 84, and into carrier gas 15.

Sealing/metering chamber 82 is formed at the bottom of removal tube 7 and above partially perforated support plate 81. Chamber 82 has a lateral exit with vertical distance 87 between plate 81 and the bottom of removal tube 7. Distance 87 is at least eight particle or absorber ball diameters, more preferably at least ten diameters.

Perforated support plate 81 extends across the diameter of removal tube 7 to angled lower guide wall 84 forming a perforated area between the diameter distance of tube 7 and wall 84. Metering gas chamber 90 is disposed below plate 81 so that metering gas 14 from metering gas line 89 passes through perforations 88 in plate 81 and lifts absorber balls away from the peripheral ball pile in chamber 82. Perforations 88 should not lie underneath tube 7 so that the sealing effect of piled absorber balls is not disturbed.

Metering gas 14 moves absorber balls 10 up and through metering shaft 83 to opening 91. Shaft 83 is formed between angled lower guide wall 84 and angled upper wall 85. The angle of walls 84 and 85 are measured from axis 86 and would be chosen to assist metering gas 14 in moving absorber balls 10 from the periphery of chamber 82.

Angled upper wall 85 traverses shaft 83 and joins vertical wall 93. The joining may be of any configuration although a curving junction surface redirects absorber balls 10 with more gradual changes.

Opening 91 is formed between vertical wall 92 and terminal edge 92 of angled bottom wall 84. Absorber balls 10 fall through opening 91 into carrier gas line opening 95 in carrier gas line 94. Gas line opening 95 is at least as long horizontally as opening 91. Upstream (relative to the direction of movement of carrier gas 15) of gas line opening 95, gas line 94 should be narrowed in effective diameter by narrowing means such as angled plate 97. The goal is to produce a venturi effect in accelerating carrier gas 15 sufficiently to form a partial suction across line opening 95 and exit in line 96 as carrier gas 15a containing entrained absorber balls.

Housing 13 has outer walls 99 surrounding removal tube 7, angled upper wall 85, vertical wall 93, and metering gas chamber 90. Walls 99 may have perforations 98 for avoiding pressure accumulation within the outer wall 99.

As shown, the absorber ball pathways are sealed such as with appropriate welds. Outer walls 99 thus serve as an external casing for the walls contacting this absorber balls.

The metering device described above has been with reference to absorber balls although other uses are contemplated. For example, catalyst dispersion is gaseous transport/reaction systems would be facilitated by the above apparatus. Another example involves mineral oil fluidized catalytic cracking and the transport of particulate catalysts.

Metering gas flow 14 may be operated continuously or discontinuously which makes possible a finely graduated rise in activity when reactivating the reactor. Interrupting the absorber ball discharge is accomplished by discontinuing the metering gas flow. The automatic flow termination due to absorber ball accumulation in chamber 82 safely prevents the undesired removal of balls.

To avoid lopsided load in vertical channels 6a during the startup of the nuclear reactor, the fill height in all four channels must be continuously observed in a comparative manner. Advantageously, the height of balls within reservoirs 8 may be used for the purpose. Differences in the fill heights of the different vertical channels 6a or reservoirs 8 may be equalized by means of differential metering gas flows until equalized heights are obtained.

Another configuration for the metering and conveyance of the absorber balls is described with reference to FIG. 7 and 8 (90 degree rotation of FIG. 7) in connection with FIG. 1. In this embodiment (shown sideways with respect to FIG. 1) removal tube 7′ terminates in bend 100 at a tangent angle on the bend of less than 90° from the vertical axis of tube 7′. The upwardly directed end of bend 100 meets line 94′ of carrier gas 15′. The lower area of the bend is provided with perforations 88′. At least the perforated area of bend 100 is located in a closed housing 13a.

Metering gas 14′ is introduced into housing 13a and may be controlled by metering valve 66′. As above, metering gas 14′ moves the absorber balls in the quantity required into carrier gas 15′ forming carrier gas 15a′ carrying entrained balls. The carrier gas flow may be regulated by trim valve 19′. If necessary and as above, an auxiliary blower 21′ may be connected to the fitting 20′.

We claim:

1. An apparatus for the shutdown of a high temperature nuclear reactor having a cylindrical core filled with a bed of fuel elements and surrounded by a side reflector and a pressure vessel, said apparatus comprising:
   a plurality of horizontal, nose-shaped projections extending from said side reflector into said core and having a vertical passage through each of said projections, whereby the vertical passages of vertically adjacent projections are aligned to form a vertical channel having a top end and a bottom end, said channel having a predetermined volume;
   a plurality of elevated reservoirs of absorber material elements located above said plurality of horizontal, nose-shaped projections and communicating with said vertical passages through a feed line between said reservoir and said passage;
   a redundantly controlled release device located between said reservoir and said feed line;
   element removal tubes connected to said bottom ends of said vertical passages;
   means for controlling absorber material element removal from said vertical channel and transporting removed absorber material elements to said reservoir connected to said element removal tubes; and
   wherein said predetermined volume of said vertical channel is sufficient to hold enough absorber material elements to shut down said nuclear reactor.

2. An apparatus according to claim 1, further comprising:
   a first gas supply line connected to a metering input of said means for controlling; and
   a second gas supply line connected to a carrier gas input of said means for controlling.

3. An apparatus according to claim 2 further comprising means for restricting said second gas supply line.

4. An apparatus according to claim 3 wherein said means for controlling exhibits a perforated support plate disposed below said removal tube and extending laterally from under said removal tube to a lower guide wall;
   whereby said perforated support plate is arranged to support absorber material elements exiting from said removal tube and separate said absorber material elements from said metering input; and
   whereby said lower guid wall is arranged with respect to said removal tube and said perforated support plate to cause absorber elements to form a pile of elements on said perforated support plate and a standing column of elements within said removal tube.

5. An apparatus according to claim 4 wherein said perforated support plate comprises perforations through said plate in an area adjacent to said lower guide wall and not in an area directly beneath said removal tube.

6. An apparatus according to claim 5 wherein said means for controlling comprises a curved tube attached between said removal tube and said carrier gas input, wherein said curved tube connects with said removal tube at an angle of less than 90 degrees with respect to said removal tube.

7. An apparatus according to claim 6 wherein said means for controlling comprises a line between said curved tube and said reservoir connected at an opening in communication with said carrier gas input.

8. An apparatus according to claim 7 wherein said line between said curved tube and said reservoir is connected to said elevated reservoir in a tangential configuration.

9. An apparatus according to claim 2 wherein said first and second gas supply lines are connected to cold gas within said pressure vessel.

10. An apparatus according to claim 1 wherein said redundantly controlled release device comprises;
    first means for controllably opening said reservoir, and
    said second means for opening said reservoir wherein said second means for opening opens if said first means for controllably opening said reservoir is unable to open said reservoir.

11. An apparatus according to claim 10 wherein the first means for opening comprises a disk which is vertically displaceable through and with respect to the second means for opening.

12. An apparatus according to claim 11 wherein said elevated reservoir is cylindrical and said second means for opening comprises a ring which is vertically displaceable within said reservoir.

13. An apparatus according to claim 12 wherein said disk comprises top surface tapering downward and toward said ring and said ring comprises top surfaces tapering downward and toward said disk.

14. An apparatus according to claim 13 wherein a gap of less than half an absorber material element is formed between said ring and said disk.

15. An apparatus according to claim 10 wherein said release device further comprises:
a housing mounted above said reservoir on a cover for said reservoir,
a first vertically displaceable piston head within said housing and connected to a first piston rod passing through said cover and connected to the first means for controllably opening within the reservoir, and
a second vertically displaceable piston head within said housing and connected to a second piston and rod passing through said cover and connected to the second means for opening within the reservoir.

16. An apparatus according to claim 15 wherein said second piston rod is a concentric sleeve surrounding said first piston rod.

17. An apparatus according to claim 16 wherein said second piston rod comprises an external shoulder below said cover, said shoulder having a size sufficient to act as a stop for upward movement of said second piston rod.

18. An apparatus according to claim 15 wherein said first piston rod is parallel to said second piston.

19. An apparatus according to claim 15 wherein said housing further comprises position detectors for each piston head.

20. An apparatus according to claim 1 wherein said absorber material elements are ball shaped.

* * * * *